(12) United States Patent
Yao

(10) Patent No.: US 7,983,314 B2
(45) Date of Patent: Jul. 19, 2011

(54) POLARIZATION STABLE LASERS

(75) Inventor: Xiaotian Steve Yao, Diamond Bar, CA (US)

(73) Assignee: General Photonics Corporation, Chino, CA (US)

(*) Notice: Subject to any disclaimer, the term of this patent is extended or adjusted under 35 U.S.C. 154(b) by 0 days.

(21) Appl. No.: 12/360,761

(22) Filed: Jan. 27, 2009

(65) Prior Publication Data

US 2009/0238218 A1 Sep. 24, 2009

Related U.S. Application Data

(60) Provisional application No. 61/028,462, filed on Feb. 13, 2008.

(51) Int. Cl.
*H01S 3/10* (2006.01)
*H01S 3/13* (2006.01)

(52) U.S. Cl. .................... 372/20; 372/27; 372/29.02

(58) Field of Classification Search .............. 372/27, 372/29.02, 29.022, 92, 94, 97–99, 102
See application file for complete search history.

(56) References Cited

U.S. PATENT DOCUMENTS

| 5,574,739 A * | 11/1996 | Carruthers et al. ........... 372/27 |
| 5,646,774 A * | 7/1997 | Takara et al. ................ 359/340 |
| 6,567,438 B2 * | 5/2003 | Lin ............................. 372/34 |
| 6,996,136 B1 * | 2/2006 | Carruthers et al. ........... 372/6 |
| 2003/0063837 A1 * | 4/2003 | Gupta et al. ................. 385/15 |
| 2005/0035295 A1 * | 2/2005 | Bouma et al. ............. 250/341.1 |
| 2007/0153289 A1 * | 7/2007 | Yilmaz et al. ............... 356/464 |
| 2008/0054160 A1 * | 3/2008 | Yao ............................ 250/205 |

OTHER PUBLICATIONS

Huber, R., et al., "Fourier Domain Mode Locking (FDML): A New Laser Operating Regime and Applications for Optical Coherence Tomography," *Optics Express*, 14(8):3225-3237, Apr. 2006.
Yun, S.H., et al., "Extended-Cavity Semiconductor Wavelength-Swept Laser for Biomedical Imaging," *IEEE Photonics Technology Letters*, 16(1):293-295, Jan. 2004.
Yun, S.H., et al., "High-Speed Wavelength-Swept Semiconductor Laser with a Polygon-Scanner-Based Wavelength Filter," *Optics Letters*, 28(20):1981-1983, Oct. 2003.

* cited by examiner

*Primary Examiner* — Minsun Harvey
*Assistant Examiner* — Phillip Nguyen
(74) *Attorney, Agent, or Firm* — Perkins Coie LLP

(57) ABSTRACT

Techniques, devices and applications of polarization stable lasers to provide laser operations against changes, variations or fluctuations in optical polarization in a laser cavity.

24 Claims, 13 Drawing Sheets

POLARIZATION STABLE LASERS

PRIORITY CLAIM

This document claims the benefits of U.S. Provisional Patent Application Ser. No. 61/028,462 entitled "Polarization Stable Lasers" and filed on Feb. 13, 2008, the entire disclosure of which is incorporated by reference as part of the disclosure of this document.

BACKGROUND

This document relates to techniques, apparatus and systems for producing laser beams, including tunable and wavelength-swept lasers.

A laser includes an optical cavity or resonator and a laser gain medium in the optical cavity. A laser can be designed to include a frequency tuning element to sweep the laser frequency or wavelength during the laser operation. A wavelength-swept laser beam from such a laser can be used in various applications. As an example, fast wavelength-swept lasers are used in optical coherent tomography (OCT) applications and sensor interrogation applications.

SUMMARY

Techniques, devices and applications of polarization stable lasers are described in this document to provide laser operations against changes, variations or fluctuations in optical polarization in a laser cavity. In one implementation, a polarization stabile laser can include a unidirectional optical loop and a polarization reflector that are optically coupled to each other via a bi-directional optical path to select one optical polarization for laser oscillation while suppressing light in other polarizations. An optical amplifier is provided in at least one of the unidirectional optical loop and the bi-directional optical path to provide the laser gain for the laser. An optical filter, either tunable or fixed, may be coupled to one of the unidirectional optical loop and the bi-directional optical path to select the laser wavelength to lase. This optical filter can be a reflective optical filter that is optically coupled to the unidirectional optical loop or a transmissive optical filter that is optically coupled in either the unidirectional optical loop and the bi-directional optical path.

In another implementation, a polarization stable laser includes an optical polarization beam splitter (PBS) having a first port, a second port and a third port. Light at a first optical polarization transmits through the PBS between the first port and the second port, and light at a second optical polarization orthogonal to the first optical polarization that enters the first port is directed to the third port. A first optical path having a first end and a second end is provided in this device and the first end is optically coupled to the first port of the PBS to direct light into the first port of the PBS and to receive light in the first optical polarization that transmits through the PBS from the second port to the first port. A polarization reflector is coupled to the second end of the first optical path to reflect light received from the first optical path back to the first optical path with a reflected optical polarization that is orthogonal to a polarization of the light that initially enters the first optical path upon exiting the first port of the PBS. This device includes a second optical path having a first end and a second end, the first end optically coupled to the third port of the PBS to receive light in the second optical polarization from the third port and to direct the received light to the second. This device also includes an optical circulator and an optical unit that are connected to each other via a third optical path. The optical circulator includes a first port, a second port and a third port to direct light received at the first port to output at the second port and to direct light received at the second port to output at the third port. The first port is optically coupled to the second end of the second optical path to direct light from the second optical path to the second port. The optical unit is optically coupled to the second port of the optical circulator to receive light and to direct a returned light beam back to the second port of the optical circulator. The third optical path is connected between the third port of the optical circulator and the second port of the PBS to direct the returned light beam from the optical unit at the third port of the optical circulator to the second port of the PBS which directs the light in the first optical polarization in the third optical path from the second port of the PBS to the first port of the PBS. In this device, an optical amplifier is coupled in at least one of the first, second and third optical paths to amplify light to cause a laser oscillation in light circulating from the polarization reflector, to PBS via the first optical path, to the optical circulator via the second optical path, to the optical unit, to the optical circulator, to the PBS via the third optical path, and to the polarization reflector.

In another implementation, a polarization stable laser includes an optical polarization beam splitter (PBS) having a first port, a second port and a third port, a first optical path, and a polarization reflector. The light at a first optical polarization transmits through the PBS between the first port and the second port, and light at a second optical polarization orthogonal to the first optical polarization that enters the first port is directed to the third port. The first optical path has a first end and a second end and the first end is optically coupled to the first port of the PBS to direct light into the first port of the PBS and to receive light in the first optical polarization that transmits through the PBS from the second port to the first port. The polarization reflector is coupled to the second end of the first optical path to reflect light received from the first optical path back to the first optical path with a reflected optical polarization that is orthogonal to a polarization of the light that initially enters the first optical path upon exiting the first port of the PBS. This laser includes a second optical path having a first end and a second end and the first end is optically coupled to the third port of the PBS to receive light in the second optical polarization from the third port and to direct the received light to the second end. The second end of the second optical path is optically coupled to the second port of the PBS which directs the light in the first optical polarization in the second optical path from the second port of the PBS to the first port of the PBS. An optical amplifier is coupled in at least one of the first and second optical paths to amplify light to cause a laser oscillation in light circulating from the polarization reflector, to PBS via the first optical path, to the second optical path, to the PBS, and to the polarization reflector.

In yet another implementation, a polarization stable laser includes an optical circulator, a polarization reflector and a first optical path. The optical circulator includes a first port, a second port and a third port to direct light received at the first port to output at the second port and to direct light received at the second port to output at the third port. The first optical path has a first end and a second end, and the first end is optically coupled to the second port of the optical circulator to direct light into the first port of the optical circulator and to receive light. The polarization reflector is coupled to the second end of the first optical path to reflect light received from the first optical path back to the first optical path with a reflected optical polarization that is orthogonal to a polarization of the light that initially enters the first optical path upon exiting the second port of the optical circulator. This laser includes a second optical path having a first end and a second end, and the first end is optically coupled to the third port of the optical circulator to receive light from the third port and to direct the received light to the second end. The second end of the second optical path is optically coupled to the first port of the optical circulator which directs the light received in the second optical path from the first port of the optical circulator to the second port of the optical circulator. An optical amplifier is coupled in at least one of the first and second optical paths to amplify light to cause a laser oscillation in light circulating from the polarization reflector, to the optical circulator via the first optical path, to the second optical path, to the optical circulator, and to the polarization reflector These and other implementations of polarization stable lasers, the associated techniques and their application are described in greater detail in the drawings, the description and the claims.

DETAILED DESCRIPTION

One technical challenge in building lasers, including tunable lasers and wavelength-swept fiber lasers is the sensitivity to polarization variations because the polarization in a laser cavity, which may include an optical fiber in some lasers, can vary with various factors, e.g., when temperature or mechanical stress changes. As a result, the laser output is sensitive to changes in temperature, vibration, or mechanical stress applied to the fiber. Lasers such as tunable and wavelength-swept lasers, can be built in various configurations, including fiber laser designs where the optical paths and the laser gain media of the laser cavity are built in or integrated with fiber. For example, a fast wavelength-swept laser can be built based on a Fourier domain mode-locking mechanism in which a long (e.g., a few km) of single-mode (SM) fiber is used to increase the cavity length of the laser to meet the condition for frequency domain mode locking. In this design, the wavelength scan rate equals the round trip time of light inside the laser cavity. An example is described by R. Huber, M. Wojtkowski, J. G. Fujimoto, "Fourier domain mode locking (FDML): a new laser operating regime and applications for optical coherence tomography", Optics Express, Vol. 14, No. 8, pp. 3225-3237 (2006). Because the long single mode optical fiber is used, the polarization inside the laser cavity tend to fluctuate and therefore cause the power and output polarization of the laser to fluctuate.

Lasers in other configurations can also exhibit sensitivity to optical polarization and laser performance can be severely degraded by variations in optical polarization in the laser resonator.

This document describes examples of lasers that include an intra-cavity polarization selection section within the laser cavity that selects light in a first optical polarization to lase while attenuating light in a second optical polarization that is orthogonal to the first optical polarization. A polarization beam splitter is included in this intra-cavity polarization selection section to separate light in the first and second optical polarizations. An optical loop is provided in the intra-cavity polarization selection section to prefer the first optical polarization over the second optical polarization. As a result, the first optical polarization is sustained in the intra-cavity polarization selection section regardless how optical polarization states are changed in other parts of the laser. Therefore, the laser performance is stabilized against fluctuations in optical polarization and such a laser is a polarization stable laser in this context. The present techniques can be used in various lasers, including but not limited to, tunable lasers, wavelength-swept lasers, and wavelength-stabilized lasers.

Figure 1:
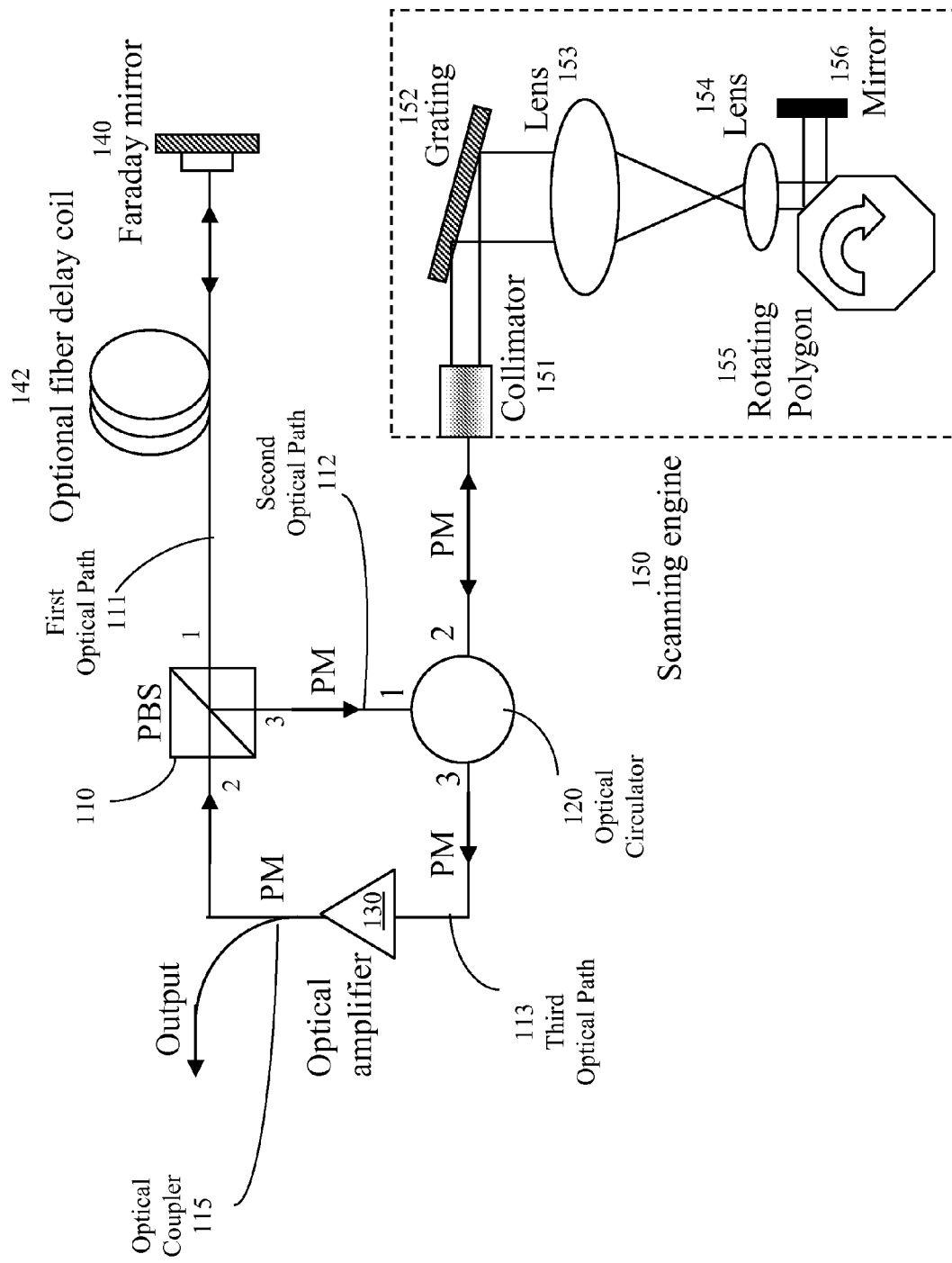
FIGS. 1 and 2 show examples of tunable polarization stable lasers that include a unidirectional and polarization maintaining loop and an optical unit that provides a reflective tunable filter functions of tuning and scanning of the laser wavelength.
Figure 2:
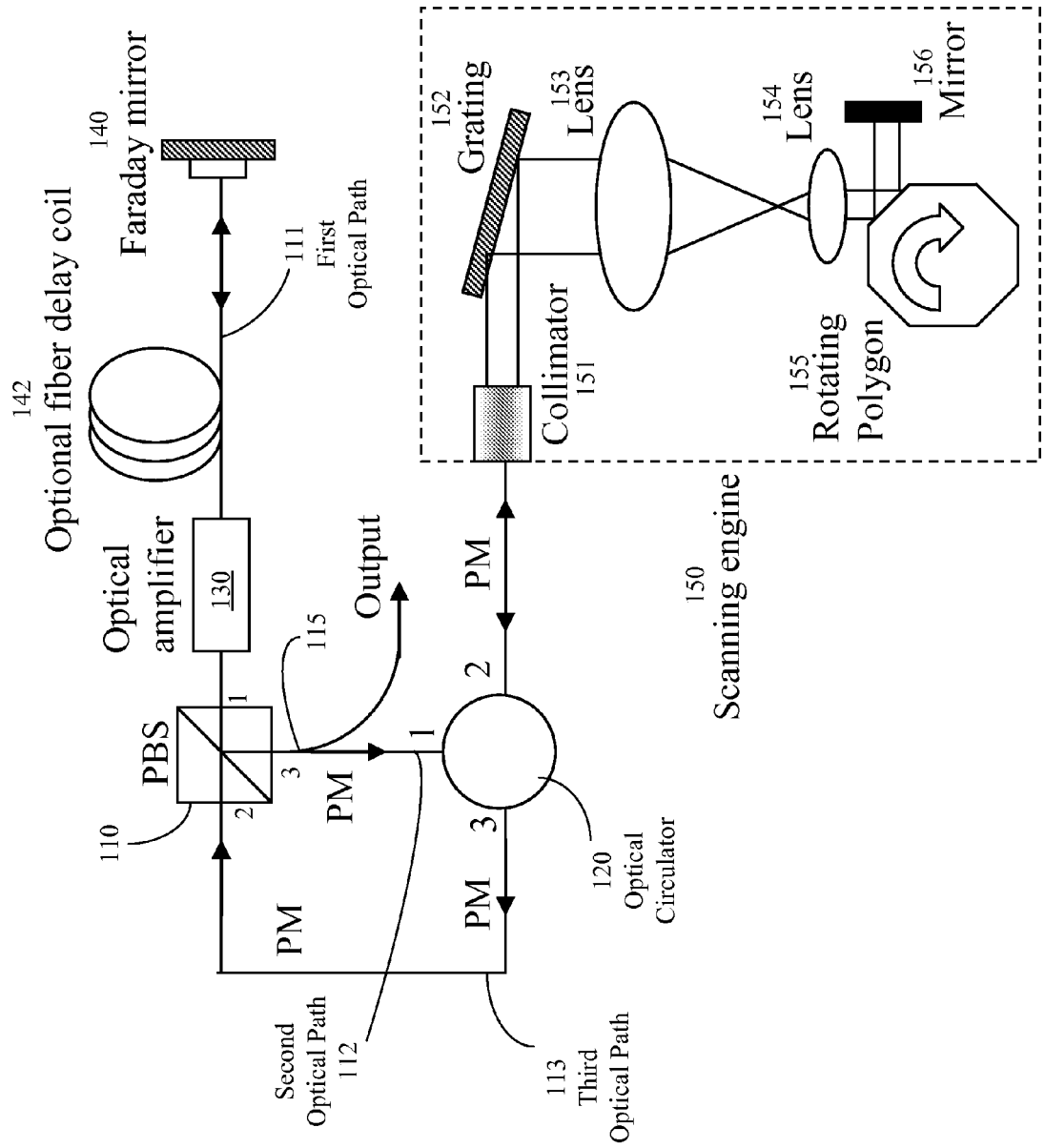

FIGS. 1 and 2 illustrate examples of polarization stable lasers under a first laser design. This design can be used to build both a polarization stable laser operating at a fixed laser wavelength and a tunable or wavelength-swept polarization laser. Such a laser includes an optical polarization beam splitter (PBS) 110 having a first port, a second port and a third port. Light at a first optical polarization transmits through the PBS 110 between the first port and the second port, and light at a second optical polarization orthogonal to the first optical polarization that enters the first port is directed to the third port. This laser includes a first optical path 111 having a first end and a second end where the first end is optically coupled to the first port of the PBS 110 to direct light into the first port of the PBS 110 and to receive light in the first optical polarization that transmits through the PBS 110 from the second port to the first port. In this laser, a polarization reflector 140 is coupled to the second end of the first optical path 111 to reflect light received from the first optical path 111 back to the first optical path with a reflected optical polarization that is orthogonal to a polarization of the light that initially enters the first optical path 111 upon exiting the first port of the PBS 110. This laser also includes a second optical path 112 having a first end and a second end where the first end is optically coupled to the third port of the PBS 110 to receive light in the second optical polarization from the third port and to direct the received light to the second end. This laser includes an optical circulator 120 having a first port coupled to the second optical path 112, a second port and a third port to direct light received at the first port to output at the second port and to direct light received at the second port to output at the third port. The first port is optically coupled to the second end of the second optical path 112 to direct light from the second optical path 112 to the second port. Connected to the second port of the optical circulator 120 is an optical reflective unit 150 that receives light from the second port of the optical circulator 120 and to direct a returned light beam back to the second port of the optical circulator 120. This optical reflective unit 150 can be a reflective optical filter that is either tunable or has a fixed reflection wavelength to control the laser wavelength of the laser. A third optical path 113 is connected between the third port of the optical circulator 120 and the second port of the PBS 110 to direct the returned light beam from the optical unit 150 from the third port of the optical circulator 120 to the second port of the PBS 110 which directs the light in the first optical polarization in the third optical path 113 from the second port of the PBS 110 to the first port of the PBS 110.

An optical amplifier 130 is coupled in at least one of the first, second and third optical paths 111, 112 and 113 to amplify light to cause a laser oscillation in light circulating from the polarization reflector 140, to PBS 110 via the first optical path 111, to the optical circulator 120 via the second optical path 112, to the optical unit 150, to the optical circulator 120 again, to the PBS 110 via the third optical path 113, and to the polarization reflector 140.

The lasers in FIGS. 1 and 2 can configured as fiber lasers. Referring to FIG. 1, the laser in the illustrated example is a fiber laser that uses PM fibers in the second and third optical paths 112 and 113 and the optical path between the circulator 120 and the optical unit 150 to maintain desired respective polarizations. As illustrated, the PBS 110 can be pigtailed with two polarization maintaining (PM) fibers forming the second and third optical paths 112 and 113 and a single mode fiber (SM) at the first port as the first optical path 111. A PM fiber may also be used in the first optical path 111. The optical circulator 120 can be a PM circulator which maintains polarization of light when redirecting the light between ports. The PM circulator 120 uses its first port to receive light from the PBS 110 and directs the received light from the PBS 110 to the second port of the circulator 120. The light from the second port of the circulator 120 is then inputted into the optical unit 150 which can be a scanning filter or a tunable filter (the scanning engine) and can be sensitive to optical polarization. The light reflected from the scanning or tunable filter in the optical unit 150 is received at the second port of the circulator 120 and is then directed to the third port of the circulator 120. The optical amplifier 130 is connected between the PBS 110 and the circulator 120 in the third optical path 113 and can be implemented in various configurations, such as a semiconductor optical amplifier (SOA) that is electrically excited to produce an optical gain or Er doped fiber amplifier (EDFA) or other rare earth ion doped fiber amplifier under optical excitation by a pump laser at a pump laser wavelength. The optical amplifier 130 can be connected with PM fiber pigtail. The output from the optical amplifier 130 is then connected to a second PM port of the PBS. Light from the second PM port enters into the SM port and propagate inside the SM fiber until it is reflected by the Faraday mirror 140. Because of the ortho-conjugate property of the Faraday mirror 140, the reflected light is directed into the first PM port by the PBS 110. This forms a polarization insensitive loop. To obtain the maximum optical output, a PM coupler 115 may be connected to the output of the optical amplifier 130 to provide stable output polarization for the laser.

In the lasers in FIGS. 1 and 2, the optical unit 150 connected to the optical circulator 120 can be designed to perform various optical operations on the light received from the second port of the optical circulator 120. For example, for a tunable or wavelength-swept laser, the optical unit 150 can be a tunable wavelength-filtering optical element optically coupled to the second port of the optical circulator 120 to filter the received light in wavelength to produce the returned light beam with a center optical wavelength and to tune the center optical wavelength. For another example, the optical unit 150 may be a fixed optical reflective filter that reflects light at a given center optical wavelength while blocking light at other wavelengths.

FIGS. 1 and 2 illustrate a specific example of the optical unit 150 as a tunable optical reflective device. The polarization of the light that is directed into the scanning or tunable filter of the optical unit 150 is either S or P polarization with respect to the reflection surfaces of the optical components inside the optical unit 150 and the optical unit 150 is designed so that the polarization state of returned light is not changed after passing through the filter. More specifically, the optical unit 150 includes an optical diffraction grating 152 that receives light from the second port of the optical circulator 120 and diffracts the received light. Lenses 153 and 154 are used to receive the diffracted light from the grating 152 and direct the diffracted light to a rotating polygon 155. The polygon 155 reflects the diffracted light onto a mirror 156 which reflects the light from the polygon 155 back to the polygon 155. The polygon 155 directs the reflected light from the mirror 156 back to the grating 152 via the lenses 154 and 153. Next, the grating 152 diffracts the received light from the polygon 155 to the second port of the circulator 120. As the polygon 155 rotates, light at different directions in the diffracted light from the grating 152 is directed to the mirror 156 at different times. This mechanism forms the wavelength scanning mechanism for the optical unit 150 to provide the wavelength sweeping in the laser. The facets of the polygon 155 provide repetitive sweeping operations for the laser. Other constructions of the scanning or tunable filter can be implemented as long as the filtered light can be reflected back to the circulator 120. When a PM fiber is used to direct light between the optical circulator 120 and the optical unit 150, an optical beam collimator 151, such as a fiber collimator, may be placed in the optical path between the grating 152 and the end facet of the PM fiber to couple the light into the PM fiber and to collimate the light coming out of the PM fiber.

The optical amplifier 130 in FIG. 1 is in the third optical path 113 which is a unidirectional optical path where laser light only propagates in the clockwise direction. FIG. 2 shows an alternative design of the scanning wavelength laser, where the optical amplifier 130 is placed in the bi-directional first optical path 111 that is formed by either SM or PM fiber. The ortho-conjugate property of the Faraday mirror 140 can automatically compensate for polarization sensitivity of the optical amplifier 130 in this design and, for each round-trip of the light in the laser, the light passes through the amplifier 130 twice to increase the optical gain of the laser.

Different from the reflective optical unit 150 in FIGS. 1 and 2, the polarization stable lasers in FIGS. 3-8 use a transmissive optical filter 314 inside the laser cavity to select light at the center transmission wavelength of the filter as the laser wavelength to laser while blocking light at other wavelengths from being amplified. This use of the transmissive optical filter 314 inside the laser cavity simplifies the laser cavity construction when compared to the lasers in FIGS. 1 and 2. In some implementations, the transmissive optical filter 314 in lasers shown in FIGS. 3-8 may be eliminated and the selection of the laser wavelength may be accomplished by the designs of the amplifier 130 and other components in the laser cavity.

Figure 3:
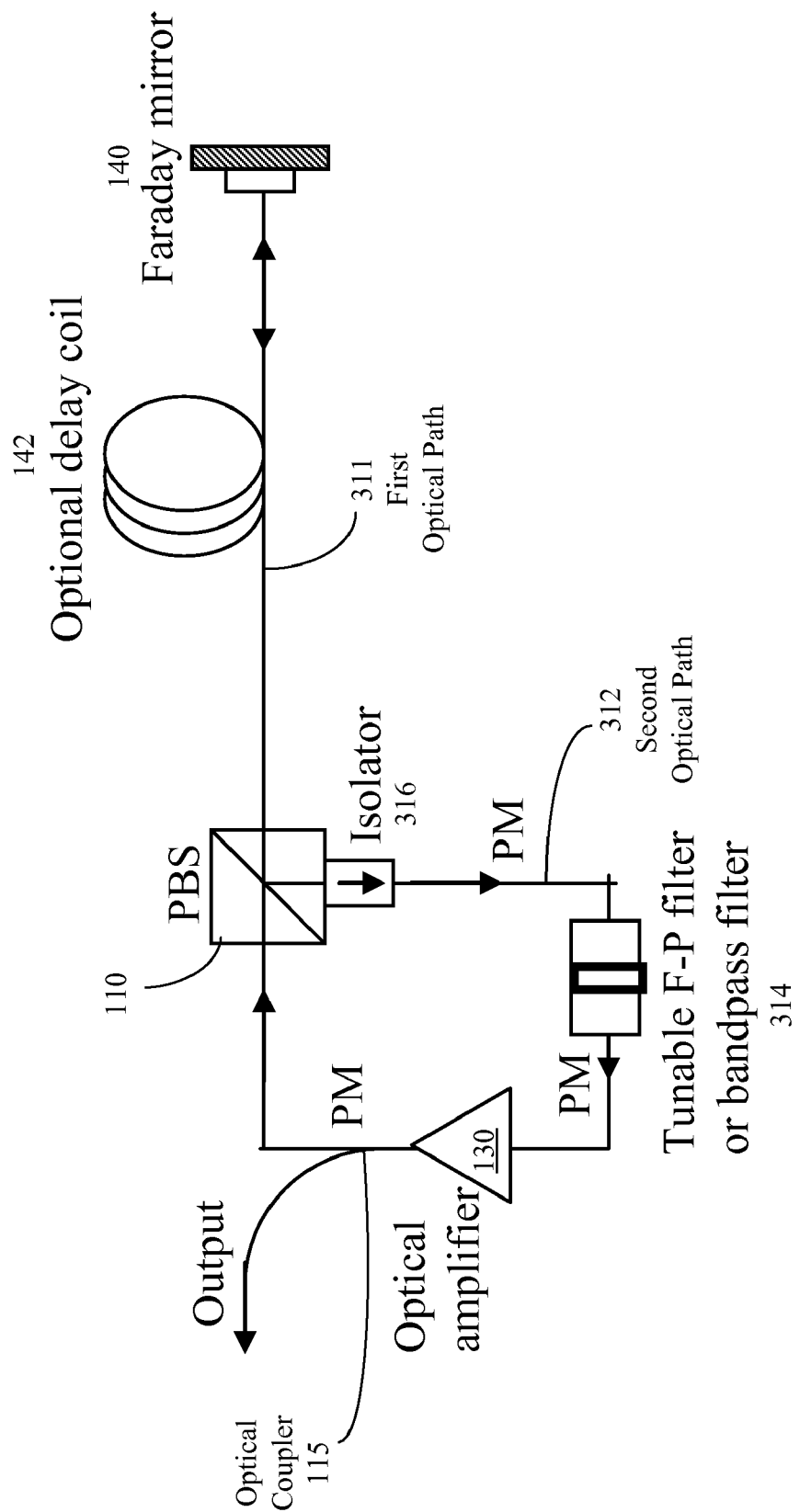
FIG. 3 shows an example of a scanning wavelength laser, in which a tunable filter is of a transmissive type in a unidirectional and polarization maintaining loop for tuning and scanning of the laser wavelength, where fiber pigtails of components in the loop formed by the PBS are formed by polarization maintaining fibers for environmental stability.
Figure 4:
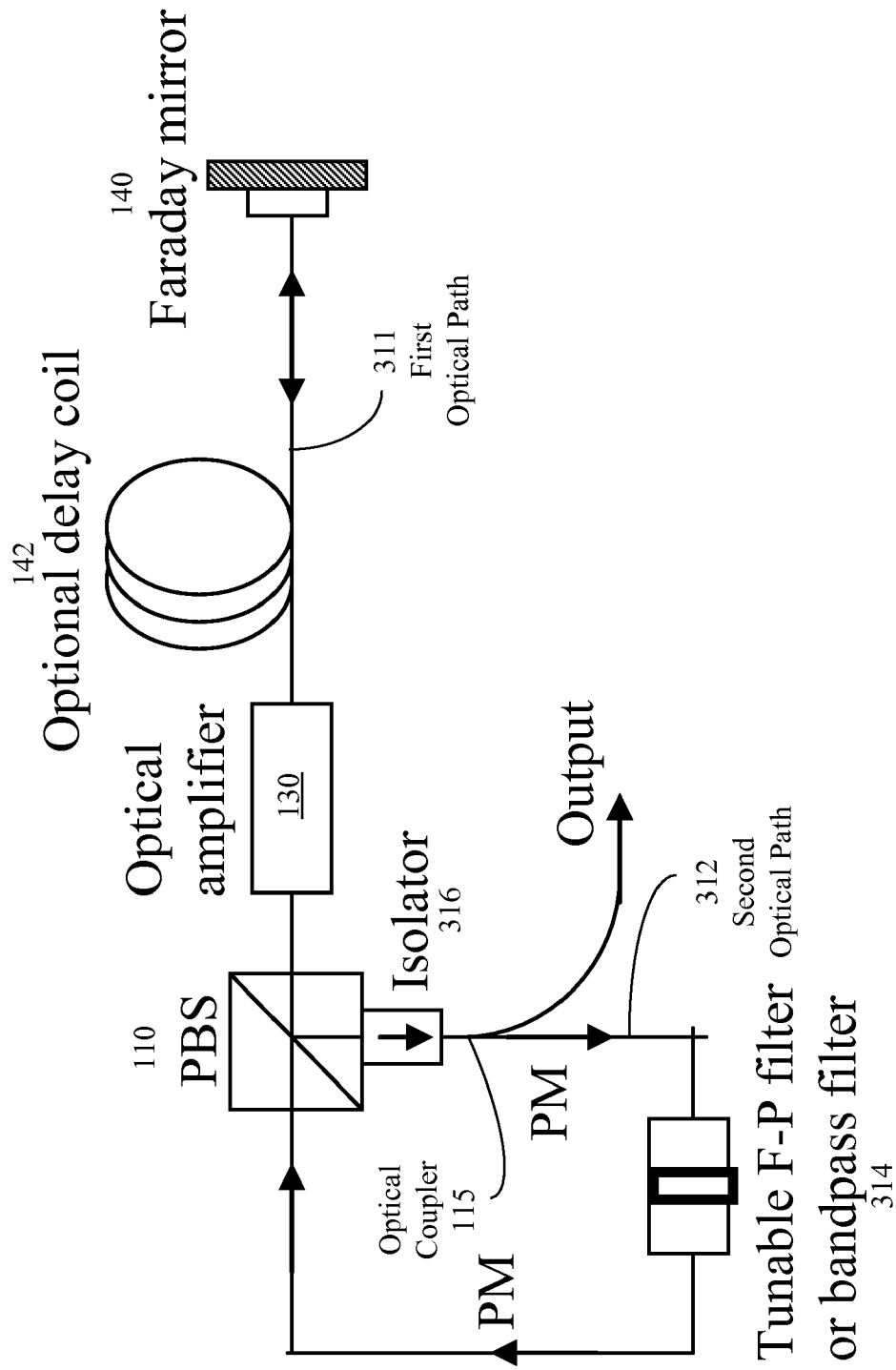
FIG. 4 shows another example of a tunable polarization stable laser in which the optical amplifier is bi-directional and is placed in the linear region of the laser cavity.
Figure 5:
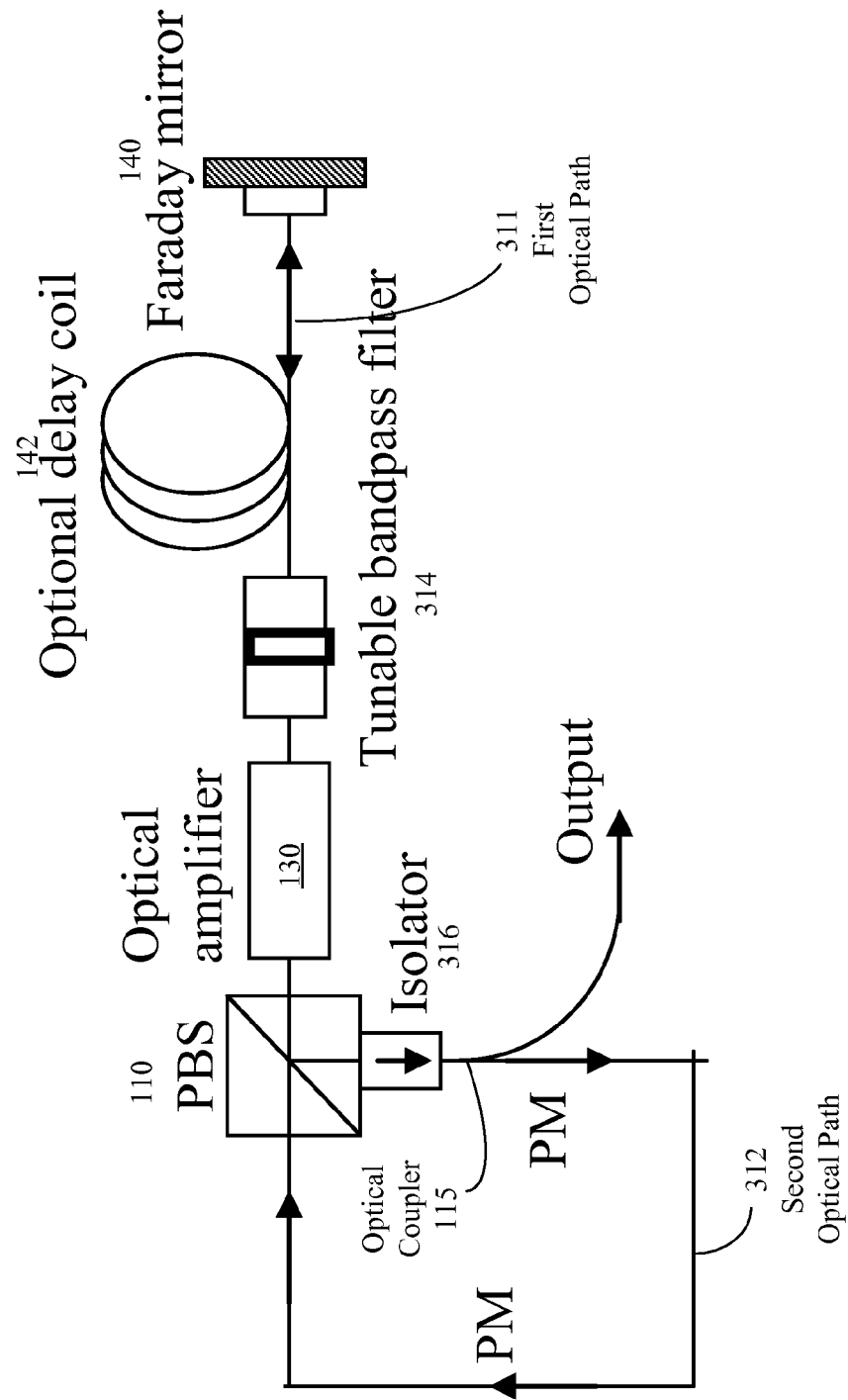
FIG. 5 shows an example of a tunable polarization stable laser in which both the amplifier and tunable filter are bi-directional and are placed in the linear region of the laser cavity.

FIGS. 3-5 illustrate examples of lasers under a second laser design based on a transmissive optical filter inside the laser cavity. This design can be used for tunable or wavelength-swept lasers. A laser under the second laser design in these examples includes an optical polarization beam splitter (PBS) 110 having a first port, a second port and a third port. Light at a first optical polarization transmits through the PBS 110 between the first port and the second port, and light at a second optical polarization orthogonal to the first optical polarization that enters the first port is directed to the third port. A first optical path 311 is included in this laser to have a first end and a second end where the first end is optically coupled to the first port of the PBS 110 to direct light into the first port of the PBS 110 and to receive light in the first optical polarization that transmits through the PBS 110 from the second port to the first port. This laser includes a polarization reflector 140 coupled to the second end of the first optical path 311 to reflect light received from the first optical path 311 back to the first optical path 311 with a reflected optical polarization that is orthogonal to a polarization of the light that initially enters the first optical path 311 upon exiting the first port of the PBS 110. A second optical path 312 is included to have a first end and a second end where the first end is optically coupled to the third port of the PBS 110 to receive light in the second optical polarization from the third port and to direct the received light to the second end. The second end of the second optical path 312 is optically coupled to the second port of the PBS 110 which directs the light in the first optical polarization in the second optical path from the second port of the PBS 110 to the first port of the PBS 110. This laser also includes an optical amplifier 130 coupled in at least one of the first and second optical paths 311 and 312 to amplify light to cause a laser oscillation in light circulating from the polarization reflector 140, to PBS 110 via the first optical path 311, to the second optical path 312, to the PBS 110, and to the polarization reflector 140. To construct a tunable or wavelength-swept laser, a tunable wavelength-filtering optical element 314 can be optically coupled in one of the first and second optical paths 311 and 312 to receive light and to filter the received light in wavelength to produce filtered light with a center optical wavelength and to tune the center optical wavelength of the laser. An optical isolator 316 may be coupled in the second optical path 312 to ensure the unidirectional nature of the second optical path 312 from the third port of the PBS 110 to the second port of the PBS 110.

FIG. 3 shows the optical amplifier 130 is in the second optical path 312 in which the light passes through the amplifier 130 once in one roundtrip in the laser. In FIG. 4, the amplifier 130 is located in the first optical path 311 so that light passes through the amplifier 130 twice in one roundtrip in the laser. In both FIGS. 3 and 4, the tunable optical filter 314 is placed in the second optical path 312 to filter the light once in one roundtrip. The laser in FIG. 5 places both the filter 314 and the amplifier 130 in the first optical path 311 so that the light is filtered and amplified twice in each roundtrip.

Figure 6:
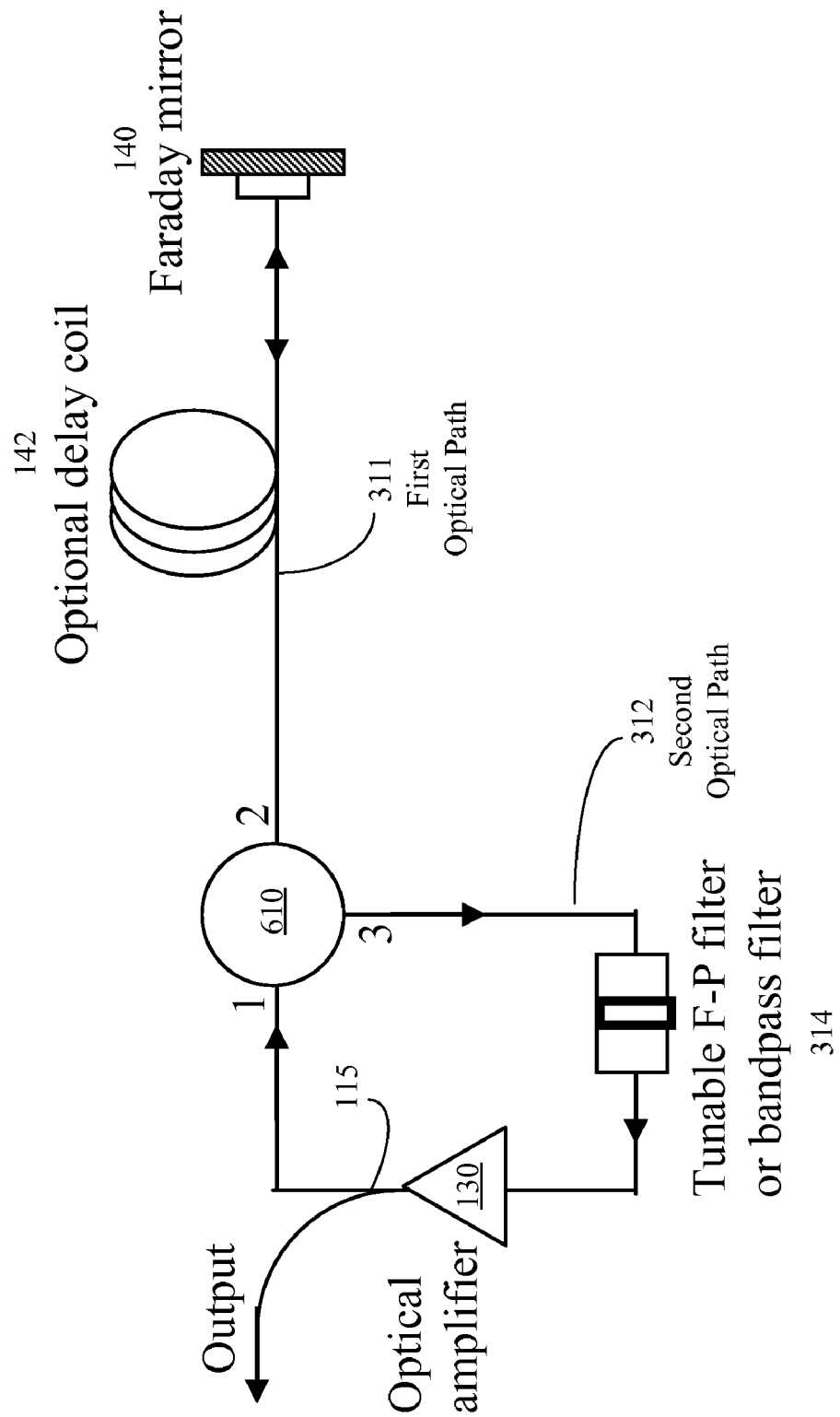
FIG. 6 shows an example of a tunable polarization stable laser in which a circulator is used to form a unidirectional and polarization maintaining loop in which the output polarization is not defined if a polarization insensitive circulator is used and the output power and wavelength are insensitive to polarization variations. A polarization sensitive circulator can be used to define polarization.
Figure 7:
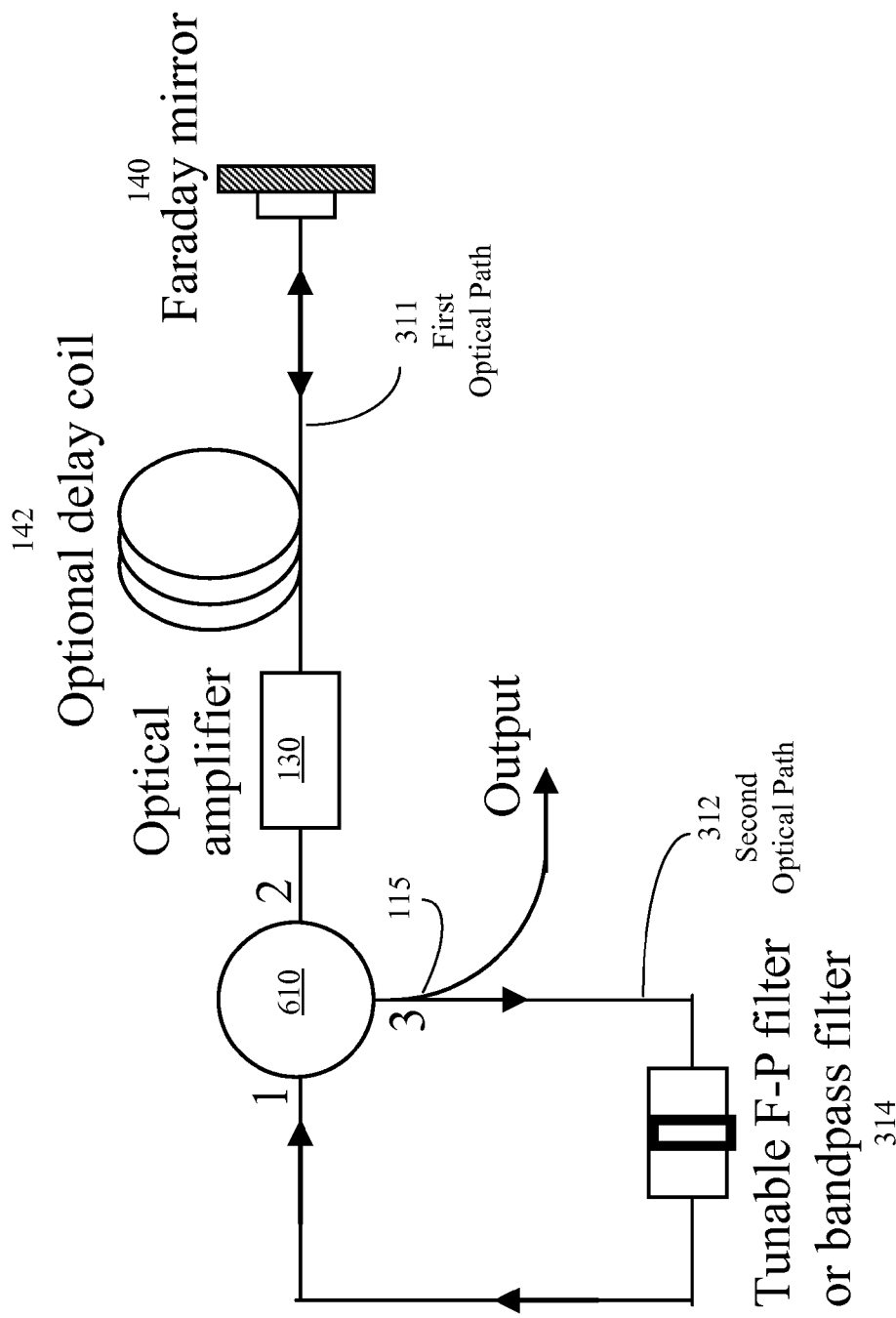
FIG. 7 shows a variation of the tunable polarization stable laser in FIG. 6 in which the optical amplifier is bi-directional and is placed in the linear region of the laser cavity.
Figure 8:
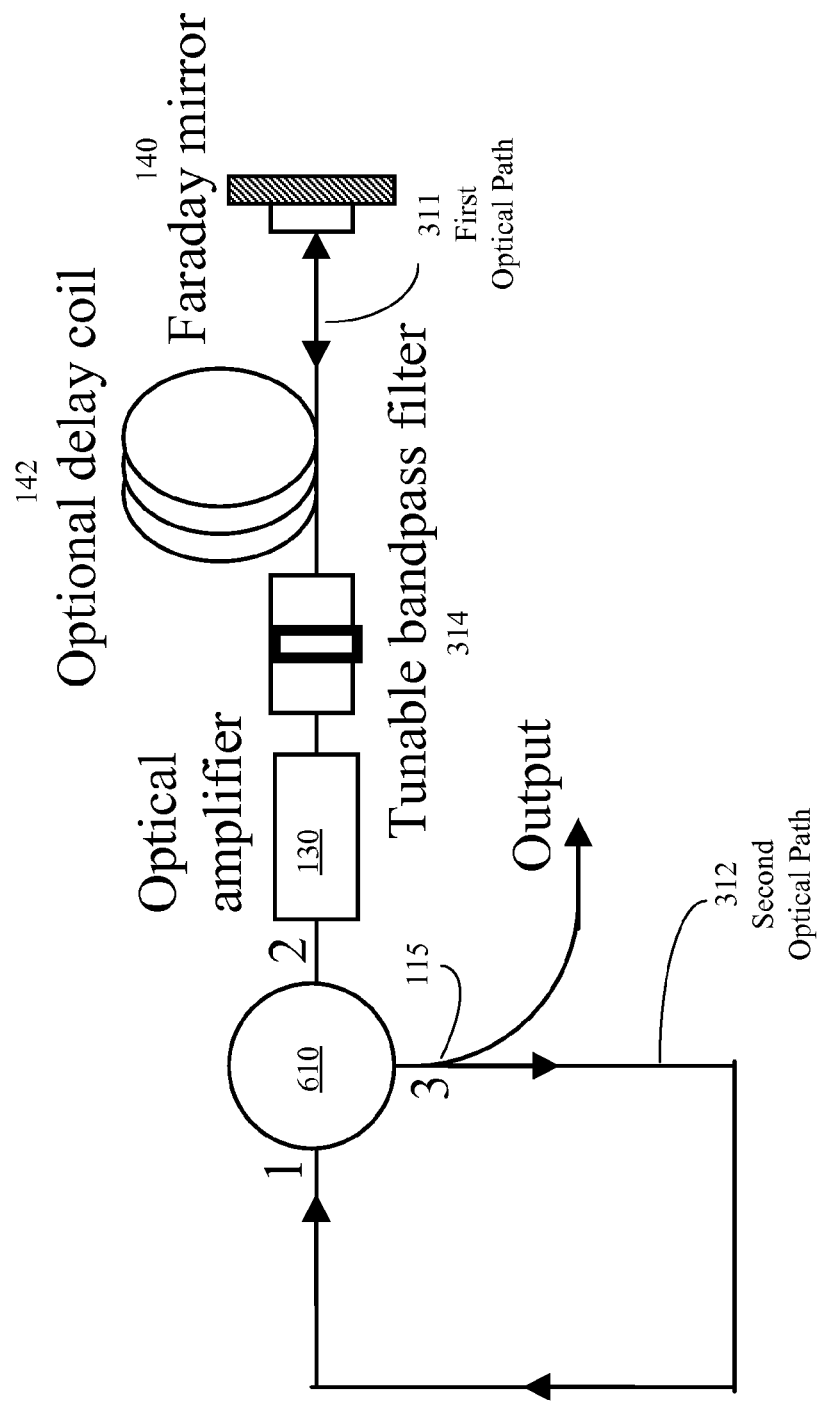
FIG. 8 shows another variation of the tunable polarization stable laser in FIG. 6 in which both the tunable filter and optical amplifier are bi-directional and are placed in the linear region of the laser cavity.

FIGS. 6-8 illustrate examples of tunable polarization stable lasers under a third laser design based on a transmissive optical filter inside the laser cavity. This design can be used for tunable or wavelength-swept lasers. A laser under the third laser design in these examples includes an optical circulator 610 having a first port, a second port and a third port to direct light received at the first port to output at the second port and to direct light received at the second port to output at the third port; and a first optical path 311 having a first end and a second end where the first end is optically coupled to the second port of the optical circulator 610 to direct light into the first port of the optical circulator 610 and to receive light. A polarization reflector 140 is coupled to the second end of the first optical path 311 to reflect light received from the first optical path 311 back to the first optical path 311 with a reflected optical polarization that is orthogonal to a polarization of the light that initially enters the first optical path 311 upon exiting the second port of the optical circulator 610. A second optical path 312 is provided and has a first end and a second end. The first end is optically coupled to the third port of the optical circulator 610 to receive light from the third port and to direct the received light to the second end. The second end of the second optical path 312 is optically coupled to the first port of the optical circulator 610 which directs the light received in the second optical path from the first port of the optical circulator 610 to the second port of the optical circulator 610. This laser also includes an optical amplifier 130 coupled in at least one of the first and second optical paths 311 and 312 to amplify light to cause a laser oscillation in light circulating from the polarization reflector 140, to the optical circulator 610 via the first optical path 311, to the second optical path 312, to the optical circulator 610, and to the polarization reflector 140. This laser can be configured as a tunable laser by coupling a tunable wavelength-filtering optical element 314 in one of the first and second optical paths 311 and 312 to receive light and to filter the received light in wavelength to produce filtered light with a center optical wavelength and to tune the center optical wavelength of the laser.

In the laser in FIG. 7, the tunable filter 314 is placed inside the loop formed by the circulator 610 while the amplifier is placed outside the loop and is in the first optical path 311 between the circulator 610 and the Faraday mirror 140. This configuration can prevent any reflections from the filter 314 from entering the amplifier 130 and can be beneficial when a Fabry-Perot (F-P) filter is used as the filter 314, because the F-P filter reflects all wavelength components that are outside the transmission bandwidth of the F-P filter and such reflected wavelength components can be blocked by the circulator 610 and thus do not get into the amplifier 130. Only the transmission wavelength component transmitting through the F-P filter 314 reaches the first port of the circulator 610 and is directed into the amplifier 130 for the laser operation.

The laser in FIG. 8 places both the tunable filter 314 and the optical amplifier 130 in the first optical path 311 between the circulator 610 and the Faraday mirror 140 so that both devices are bi-directional in the context that the laser light passes through the tunable filter 314 and the optical amplifier 130 twice in two opposite directions in a single roundtrip inside the laser cavity. In this configuration, a tunable bandpass filter can be used as the filter 314 to select the wanted transmission wavelength component for the laser operation while suppressing light at un-wanted reflection wavelength components. A F-P filter may not be suitable as the filter 314 because both the wanted transmission wavelength component and the un-wanted reflection wavelength components may build up in the laser cavity.

In the examples shown in FIGS. 1-8, the optical loop formed between two ports of the PBS 110 in FIGS. 1-5 and between the two ports of the optical circulator 610 in FIGS. 6-8 are a unidirectional loop shown in the clock-wise direction while the first optical path 111 or 311 is a bi-directional path in these examples. In the above laser examples, an optional fiber coil 142 can be inserted in the laser cavity, e.g., in the optical path between the PBS 110 and the Faraday mirror 140 in FIGS. 1-5 or between the optical circulator 610 and the Faraday mirror 140 in FIGS. 6-8, to change the laser cavity round trip time to enable frequency domain mode-locking by changing the frequency of the tunable filter at a rate equal to the mode spacing of the laser. Note that by placing the fiber coil 140 in the linear region of the laser cavity that does not include the optical amplifier, the light passes through the coil twice and therefore the length of the fiber coil can be reduced by half to meet the fiber length requirement of the frequency domain mode locking. This design can significantly reduce the size and cost of the laser system.

The polarization reflector 140 can be implemented as a Faraday reflector coupled to a second end of the first optical path (111 or 311) to reflect light received from the first optical path back to the first optical path with a reflected optical polarization that is, at each location along the first optical path, orthogonal to an optical polarization of the light when traveling in the first optical path from the PBS 110 or the circulator 610 towards the Faraday reflector prior to the reflection. In this example, the Faraday rotator is a 45-degree Faraday rotator to effectuate an ortho-conjugate property: the state of polarization (SOP) of the reflected light by the Faraday reflector is orthogonal to the forward going beam at every point along the fiber in the first optical path. As a result, at the PBS 110 or the circulator 610, the SOP of the reflected signal is orthogonal to that of the forward going light. In another example for implementing the polarization reflector 140, the polarization reflector 140 can include a reflector and a quarter wave plate whose one of two orthogonal principal polarization axes is at 45 degrees with a polarization axis of light exiting the second port of the PBS 110 or the optical circulator 610. The quarter wave plate is located between the PBS 110 or the optical circulator 610 and the reflector of the polarization reflector 140.

The optical paths in such lasers can be designed to maintain the polarization of light inside the laser cavity in a selected polarization state. The first optical path 111 or 311 may include a polarization-maintaining (PM) fiber whose principal polarization direction is aligned with the polarization of the light exiting the second port of the PBS 110 or the optical circulator 610, where the quarter wave plate is coupled between a distal end of the PM fiber and the reflector to be at 45 degrees between one of two orthogonal principal polarization axes of the quarter wave plate and the principal polarization axis of the PM fiber.

The above laser examples in FIGS. 1-8 have a built-in polarization selection mechanism. Consider the example in FIG. 1. The PBS 110, the Faraday mirror 140 and the optical loop formed by the PBS 110 and the optical circulator 120 suppress light in the optical loop with the optical amplifier 130 between the PBS 110 and the optical circulator 120 that is in the optical polarization that does not transmit through the PBS 110 to reach the Faraday mirror 140. This creates optical loss for light in this polarization. In addition, only light in the polarization that transmits through the PBS 110 from the optical loop to reach the Faraday mirror 140 can be redirected back by the Faraday mirror 140 and the PBS 110 into the optical loop with optical circulator 120. This creates additional optical loss to light in the unwanted polarization. The light in the optical loop with the optical amplifier 130 between the PBS 110 and the optical circulator 120 that is in the optical polarization that transmits through the PBS 110 to reach the Faraday mirror 140 has less optical loss than the orthogonal polarization and thus experiences a higher optical gain. Light circulation in the laser cavity amplifies the gain differences between the two orthogonal polarizations and, therefore, these lasers in are insensitive to polarization variations. The laser designs in this document can be used in fiber laser configurations to minimize or eliminate the polarization sensitivity of such fiber lasers. In particular, the present laser designs can be used to make wavelength-swept lasers with high stability against changes in temperature, stress, or vibration.

The lasers in FIGS. 1-8 can include an additional polarization selection mechanism. For example, in lasers in FIGS. 1-5, the optical loop formed between two ports of the PBS 110 can be configured to rotate the polarization of the light leaving the PBS 110 and entering the loop by 90 degrees when the light enters the PBS 110 at then end of the loop to reach the Faraday mirror 140. If the loop is formed by free space, an optical polarization rotator or polarization controller can be inserted in the loop so that the polarization that exists the PBS 110 to enter the loop is in the polarization that transmits through the PBS 110 when leaving the loop to enter the PBS 110. If the loop is formed by polarization maintaining (PM) fiber, the end tail of the PM fiber at the end of loop can be rotated by 90 degrees. For example, in FIG. 3, if the slow axis of the PM fiber is aligned with the polarization output by the PBS 110 at the beginning of the optical loop coupled to the third port of the PBS 110, the slow axis of the PM fiber at the ending side of the optical loop that is coupled to the second port of the PBS 110 should be oriented so that the polarization along the slow axis of the PM fiber transmits through the PBS 110 to reach the Faraday mirror 140. When the loop is formed by SM fibers in the examples in FIGS. 1-8, a polarization controller may be connected in the loop to rotate the polarization by 90 degrees and to ensure the polarization stability in the loop.

Figure 9:
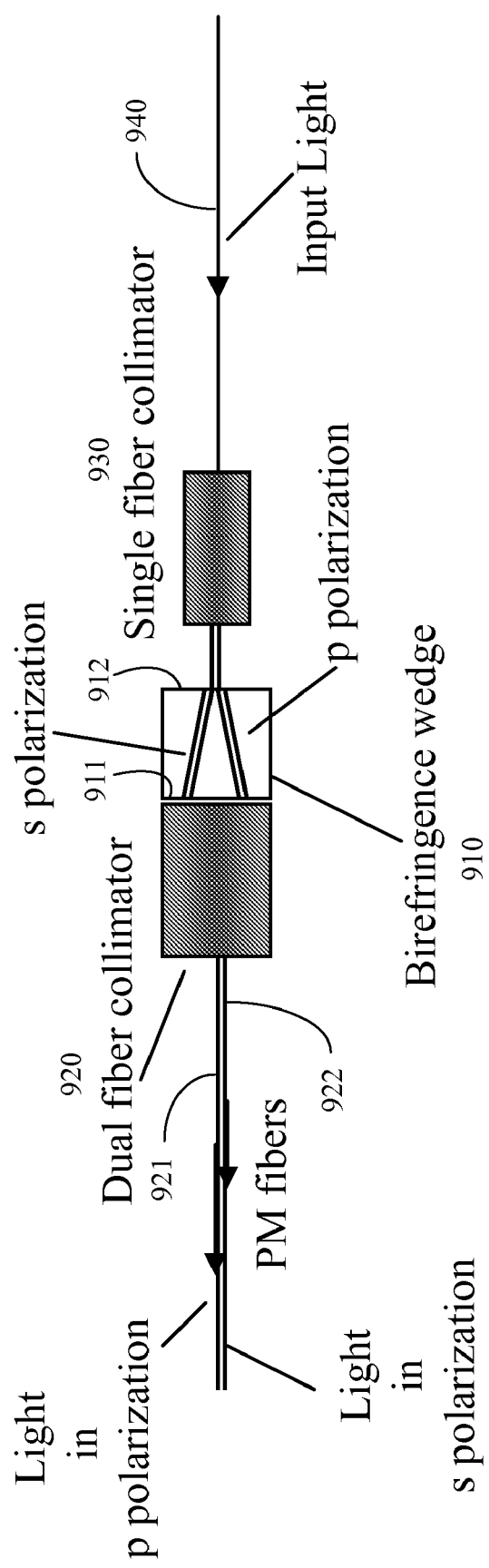
FIG. 9 shows an example of a fiber pigtailed polarization beam splitter with three ports based on a birefringent wedge and three fibers for implementing a polarization stable laser.

In FIGS. 1-5, the PBS 110 can be a polarization cube that includes a polarization selective reflective surface to reflect light in one optical polarization and transmits light the orthogonal polarization. Alternatively, the PBS 110 can include a birefringent crystal that separates light in the two orthogonal optical polarizations into a first beam along a first beam path and a second beam along a second beam path. FIG. 9 shows one example of such a PBS 110 based on a birefringent wedge 910 that separates light in the s and p polarizations along two separate optical paths in the birefringent wedge. The first port of this PBS 110 is a first fiber port connected to a single fiber 940 on one side of the birefringent wedge 910 to couple the single fiber 940 to the intersection of the two optical paths for the s polarization light and the p polarization light on the end facet 912 of the wedge 910. A fiber collimator 930 is connected between the birefringent wedge 910 and the fiber 940. Two fibers 921 and 922 are connected to the other side of the birefringent wedge 910 to form the second and third fiber ports that are respectively aligned and connected to the two separated optical paths for the s and p polarizations, respectively. As illustrated, the fiber 921 is connected to the birefringent wedge 910 at a location on the end facet 911 that is a terminal end of the optical path for the s polarization and the fiber 922 is connected to the birefringent wedge 910 at a location on the end facet 911 that is a terminal end of the optical path for the p polarization. Such a birefringent wedge based PBS can be made more compact in size than a polarization cube PBS.

The transmissive optical filter 314 in the devices in FIGS. 3-8 can be implemented in various filter configurations, such as a Fabry-Perot resonator filter and a multi-layer interference filter. Similarly, the reflective optical filter for the optical unit 150 in the devices in FIGS. 1-2 can also be implemented in other configurations different from the polygon-based design shown in FIGS. 1-2.

Figure 10:
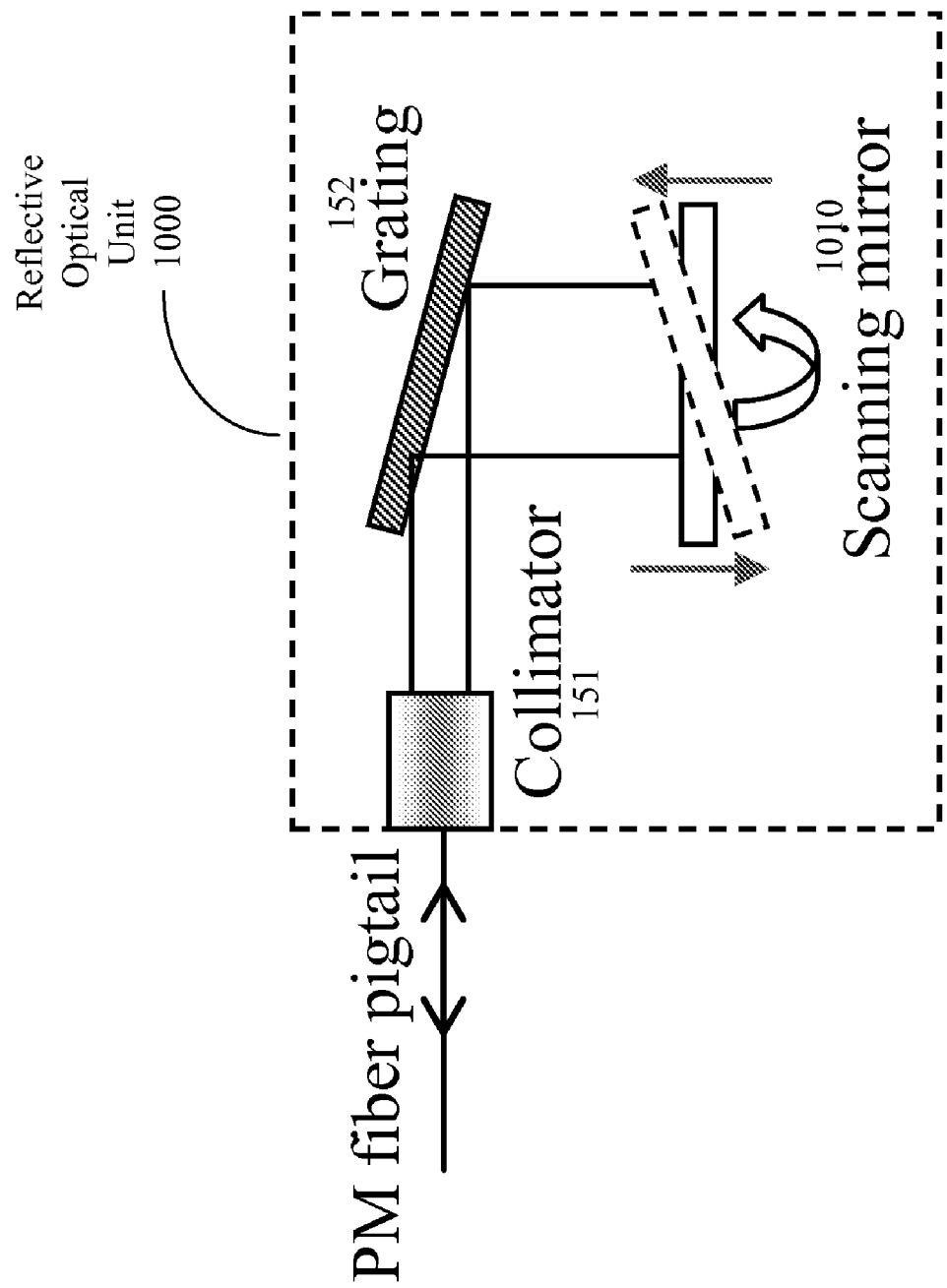
FIG. 10 shows another example of a reflective optical filer used in the reflective optical unit in the lasers in FIGS. 1 and 2.

FIG. 10 shows an example of such a reflective optical filter 1000 based on a diffractive grating 152 and a scanning mirror 1010 for use as the optical unit 150 in FIGS. 1-2. An optical collimator 151 is used to receive the input light and to direct the reflected light back along the same optical path. The diffractive grating 152 and the scanning mirror 1010 are positioned relative to each other so that the diffractive grating 152 receives the input light and diffracts the input light towards the scanning mirror 1010 so that different spectral components of the diffracted light are directed towards the scanning mirror 1010 at different directions. The scanning mirror 1010 reflects the diffracted light from the grating 152 and is oriented at an orientation to allow only a selected spectral component reflected from the scanning mirror 1010 to be directed by the grating 152 into the collimator 151 while other spectral components reflected from the scanning mirror 1010 do not enter the aperture of the collimator 151. As the orientation of the scanning mirror 1010 changes by scanning the scanning mirror 1010, different spectral components are selected to enter the collimator 151, each spectral component corresponding to a particular orientation of the scanning mirror 1010. An actuator is engaged to the scanning mirror 1010 to control the orientation of the mirror 1010 and to scan the mirror 1010. A galvanometer, for example, may be used to scan the mirror 1010.

Figure 11:
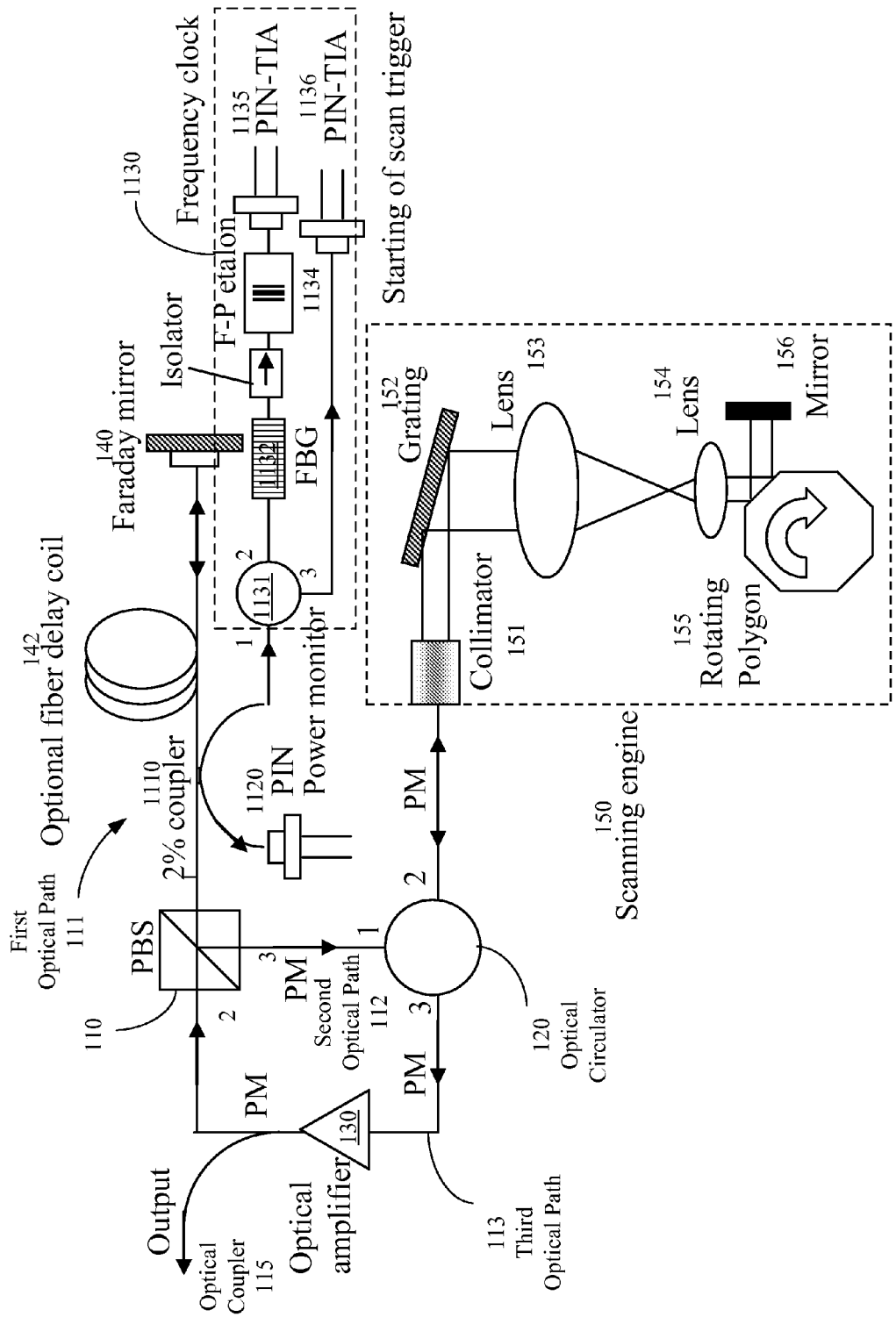
FIG. 11 shows an example of an optical monitoring module built in a polarization stable laser.

A polarization stable laser can be designed to include an optical monitoring mechanism to monitor one or more laser parameters of the laser, such as the optical power and the laser frequency of the laser. FIG. 11 shows an example of such an optical monitoring module built into the laser in FIG. 1 as an example. This monitoring module can also be built into other lasers, such as lasers in FIGS. 2-8.

The optical monitor module illustrated in FIG. 11 includes an optical coupler 111 coupled to the laser to couple a fraction of the laser in the laser cavity out. The laser output of the optical coupler 111 is then used to measure and monitor one or more laser parameters of the laser. The optical monitor module in FIG. 11 includes an optical detector 1120, e.g., a photodiode, to receive a portion of the laser output from the optical coupler 111 to measure the optical power of the received portion as a power monitor of the laser. The optical monitor module in FIG. 11 also includes a laser frequency monitor 1130 that receives another portion of the laser output from the optical coupler 111 to measure the laser frequency.

More specifically, this laser frequency monitor 1130 includes an optical circulator 1131, a fiber Bragg grating (FBG) 1132, a Fabry-Perot optical filter 1134, a first optical detector 1135 and a second optical detector 1136. The optical circulator 1131 has three ports to direct light from port 1 to port 2 and from port 2 to port 3. The port 1 is used as the input port to receive the light from the optical coupler 1110. The received light in the port 1 is directed to the port 2 which is coupled to a first optical path formed by the FBG 1132, the Fabry-Perot optical filter 1134, and the first optical detector 1135. The FBG 1132 is designed to have structure that reflects light at a known FBG resonant optical wavelength within the laser spectral range of the laser while transmitting light at other wavelengths. This known FBG resonant optical wavelength is used as a reference wavelength for measuring the laser frequency. The port 3 is coupled to a second optical path to the second optical detector 1136. Hence, when the laser wavelength is tuned to the known FBG resonant optical wavelength, the laser light directed from the circulator 1131 to the FBG 1132 is reflected back by the FBG 1132 and is not transmitted through the FBG 1132 to reach the Fabry-Perot optical filter 1134 and the first optical detector 1135. The reflected light at the known FBG resonant optical wavelength is routed by the optical circulator 1131 to the second optical detector 1136 which produces a detector output. When the laser wavelength is different from the known FBG resonant optical wavelength, the laser light laser light directed from the circulator 1131 to the FBG 1132 transmits through the FBG 1132 to enter the Fabry-Perot optical filter 1134. As the laser frequency is tuned, the Fabry-Perot optical filter 1134 transmits light whenever the wavelength of the laser light reaches a resonance of the Fabry-Perot optical filter 11134. Therefore, the tuning of the frequency of laser produces a series of resonance transmission peaks separated by the free spectral range (FSR) of the filter in the output of the Fabry-Perot optical filter 1134. The number of resonance peaks detected by the first optical detector 1135 can be used to determine the amount of change in frequency of the tuning laser but would not provide information on the absolute frequency of the laser. The FBG 1132 and the output of the second optical detector 1136 in combination provide a frequency reference so that the outputs of the both detectors 1135 and 1136 can be used to measure the absolute frequency of the laser during tuning.

In FIG. 11, the optical coupler 1110 is shown to be coupled in the first optical path which carry light in both directions. The optical detector 1120 for monitoring the laser power is coupled to receive coupled laser light that propagates towards the PBS 111 and the laser frequency monitor 1130 is coupled to receive coupled laser light that propagates towards the Faraday mirror 140. Alternatively, the optical coupler 1110 can be placed in other locations in the laser cavity, such as a location in the uni-directional loop formed by the second optical path 112, the optical circulator 120, the third optical path 113 and the PBS 110, or a location in the bi-directional path between the optical circulator 120 and the optical unit 150.

As illustrated in the above examples of polarization stable lasers, a tunable optical filter can be inserted in the laser cavity to tune the laser wavelengths. FIGS. 1, 2, 10 and 11 show examples of tunable reflective filters and FIGS. 3-8 show examples of tunable reflective filters. The bandwidth of such a laser is dictated by the bandwidth of the tunable filter. An optical filter with repetitive, periodic transmission peaks and a narrower bandwidth than the bandwidth of the tunable filter may be implemented inside the laser cavity in a polarization stable laser to reduce the laser bandwidth or to remove some unwanted spectral components in the laser light. For example, this additional optical filter can have a free spectral range (FSR) between two adjacent transmission peaks being approximately equal to or comparable to the bandwidth of the tunable filter and a transmission bandwidth that is less than the laser mode spacing of the longitudinal modes of the laser. This additional optical filter can be a fixed optical filter and may be placed in an optical path of the laser light inside the laser, e.g., either in the uni-directional loop inside the laser cavity or the bi-directional linear path of the laser cavity.

Figure 12:
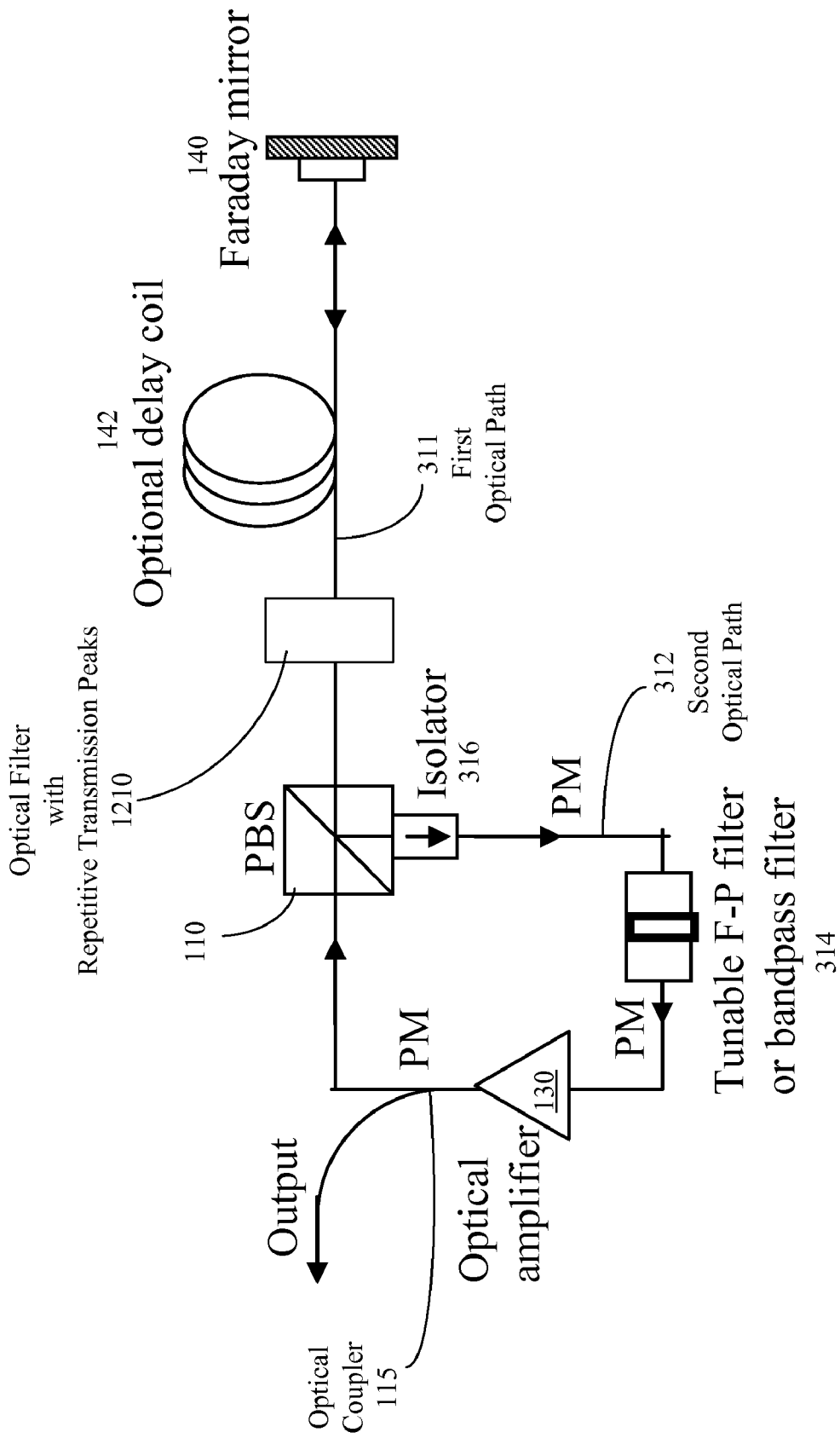
FIG. 12 shows an example of a polarization stable laser that implements a narrow band optical filter with repetitive transmission peaks to achieve a narrow band laser operation beyond the tunable optical filter used in the laser for tuning the laser.

FIG. 12 shows an example of a polarization stable laser that implements a narrow band optical filter with repetitive transmission peaks to achieve a narrow band laser operation beyond the tunable optical filter used in the laser for tuning the laser. This example provides an optical filter 1210 in the bi-directional linear path of the laser cavity in the laser in FIG. 3. The filter 1210 is located in the first optical path 311 between the PBS 110 and the Faraday mirror 140. Alternatively, the filter 1210 may be located in the second optical path 312 which is a uni-directional loop. The optical filter 1210 can be implemented as a Fabry-Perot filter that has periodic transmission peaks spaced by the FSR of the filter. The FSR is equal to or comparable to the filter bandwidth of the tunable filter 314. The bandwidth of the filter 1210 is less than the longitudinal mode spacing of the laser.

Figure 13:
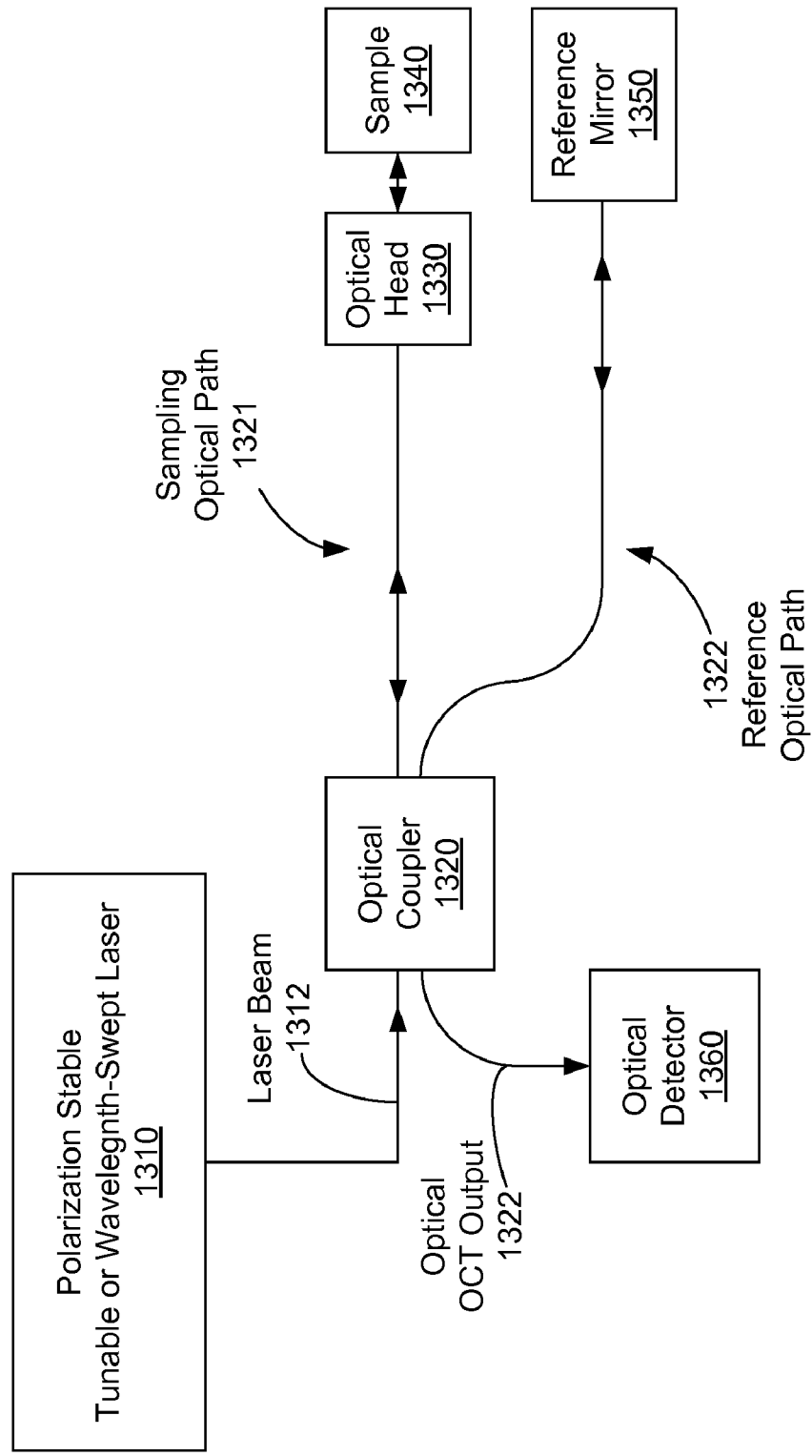
FIG. 13 shows an optical coherent tomography (OCT) device based on a polarization stable laser.

The above examples of polarization stable lasers can be used in various applications. FIG. 13 shows an optical coherent tomography (OCT) device based on a polarization stable laser. This OCT device includes a polarization stable tunable or wavelength-swept laser 1310 to produce a laser beam 1312. An optical coupler 1320 splits the laser beam 1312 into a sampling laser beam into a sampling optical path 1321 and a reference laser beam into a separate reference optical path 1322. The sampling optical path 1321 includes an optical head 1330 that projects the sampling laser beam onto a sample 1340 to be imaged by the OCT device and collects the returned light from the sample 1340. The optical head 1330 directs the collected returned light from the sample 1340 along the sampling optical path 1321 back to the optical coupler 1320. The reference optical path 1322 includes a reference mirror 1350 at its end to reflect the reference laser beam back to the optical coupler 1320. The reflected reference laser beam and the collected returned light from the sample 1340 are overlapped with each other in the optical coupler 1320 to optically interfere with each other. A portion of the combined light of the reflected reference laser beam and the collected returned light from the sample 1340 is directed by the optical coupler 1320 at an output port as an OCT signal 1322. An optical detector 1360 is used to detect the OCT signal 1322 and converts it into an electrical OCT signal for processing by an OCT processing unit to produce the measurement of the sample 1340. This use of the polarization stable laser 1310 provides enhanced OCT measurements.

In one implementation of the OCT device in FIG. 13, the polarization stable laser 1310 can be configured as a Fourier domain mode locking laser (FDML) for swept-wavelength OCT imaging. In such a FDML, a single-mode fiber is used to increase the cavity length of the laser to meet a frequency domain mode locking condition under which the wavelength scan rate of the laser 1310 is set to be equal to the round trip time of light inside the laser cavity. An example of such an OCT system is described by R. Huber, M. Wojtkowski, J. G. Fujimoto, "Fourier domain mode locking (FDML): a new laser operating regime and applications for optical coherence tomography", Optics Express, Vol. 14, No. 8, pp. 3225-3237 (2006). Because the long single mode optical fiber is used, the polarization inside the laser cavity tend to fluctuate in absence of any polarization control in the laser. The polarization stable laser designs described in this document can mitigate this problem and provides enhanced FDML OCT performance.

While this document contains many specifics, these should not be construed as limitations on the scope of the invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations are disclosed. Variations and enhancements of the disclosed implementations and other implementations can be made based on what is described and illustrated in this document.

What is claimed is:

1. A laser, comprising:
   an optical polarization beam splitter (PBS) having a first port, a second port and a third port, wherein light at a first optical polarization transmits through the PBS between the first port and the second port, and light at a second optical polarization orthogonal to the first optical polarization that enters the first port is directed to the third port;
   a first optical path having a first end and a second end, the first end optically coupled to the first port of the PBS to direct light into the first port of the PBS and to receive light in the first optical polarization that transmits through the PBS from the second port to the first port;
   a polarization reflector coupled to the second end of the first optical path to reflect light received from the first optical path back to the first optical path with a reflected optical polarization that is orthogonal to a polarization of the light that initially enters the first optical path upon exiting the first port of the PBS;
   a second optical path having a first end and a second end, the first end optically coupled to the third port of the PBS to receive light in the second optical polarization from the third port and to direct the received light to the second;
   an optical circulator having a first port, a second port and a third port to direct light received at the first port to output at the second port and to direct light received at the second port to output at the third port, the first port being optically coupled to the second end of the second optical path to direct light from the second optical path to the second port;
   an optical unit optically coupled to the second port of the optical circulator to receive light and to direct a returned light beam back to the second port of the optical circulator;
   a third optical path connected between the third port of the optical circulator and the second port of the PBS to direct the returned light beam from the optical unit at the third port of the optical circulator to the second port of the PBS which directs the light in the first optical polarization in the third optical path from the second port of the PBS to the first port of the PBS;
   an optical amplifier coupled in at least one of the first, second and third optical paths to amplify light to cause a laser oscillation in light circulating from the polarization reflector, to the PBS via the first optical path, to the optical circulator via the second optical path, to the optical unit, to the optical circulator, to the PBS via the third optical path, and to the polarization reflector
   an optical monitor module coupled to one of the first, second and third optical paths to receive a fraction of the light to split the received fraction of the light into a first monitor light beam and a second monitor light beam, the optical monitor module including (1) an optical power detector to receive the first monitor light beam to produce an output indicating a power level of the light and (2) a laser frequency monitor to receive the second monitor light beam to measure a laser frequency of the light.

2. The laser as in claim 1, wherein:
the polarization reflector comprises a Faraday reflector coupled to a second end of the first optical path to reflect light received from the first optical path back to the first optical path with a reflected optical polarization that is, at each location along the first optical path, orthogonal to an optical polarization of the light when traveling in the first optical path from the PBS towards the Faraday reflector prior to the reflection.

3. The laser as in claim 1, wherein:
the polarization reflector comprises a reflector and a quarter wave plate whose one of two orthogonal principal polarization axes is at 45 degrees with a polarization axis of light exiting the first port of the PBS when entering the first optical path, wherein the quarter wave plate is located between the PBS and the reflector.

4. The laser as in claim 1, wherein:
the optical amplifier is coupled in the third optical path between the optical circulator and the PBS.

5. The laser as in claim 4, comprising:
an optical coupler coupled between the optical amplifier and the PBS in the third optical path to couple a portion of light output by the optical amplifier as a laser output beam.

6. The laser as in claim 1, wherein:
the PBS comprises a birefringent crystal that separates light in the first and second optical polarizations into a first beam along a first beam path and a second beam along a second beam path.

7. The laser as in claim 1, wherein:
the PBS comprises a polarization cube that includes a polarization selective reflective surface to reflect light in the second optical polarization and transmits light in the first polarization.

8. The laser as in claim 1, wherein:
the optical unit includes a tunable wavelength-filtering optical element optically coupled to the second port of the optical circulator to filter the received light in wavelength to produce the returned light beam with a center optical wavelength and to tune the center optical wavelength.

9. The laser as in claim 1, wherein:
the optical unit includes a diffractive grating, a rotating polygon and a reflector arranged in series so that the diffractive grating receives light from the optical circulator and directs the received light to the rotating polygon which further directs light from the diffractive grating to the reflector and light reflected from the reflector back to the diffractive grating, and wherein rotation of the rotating polygon selects a wavelength of light that is directed from the diffractive grating to the optical circulator.

10. The laser as in claim 1, wherein:
the optical unit includes a diffractive grating, and a reflector arranged in series so that the diffractive grating receives light from the optical circulator and directs the received light to the reflector which reflects light back to the diffractive grating, and the optical unit includes an actuator engaged to the reflector to scan the reflector to scan a wavelength of light that is directed from the diffractive grating to the optical circulator.

11. The laser as in claim 1, comprising:
an optical monitor module coupled to receive a fraction of the light circulating from the polarization reflector, to the PBS via the first optical path, to the optical circulator via the second optical path, to the optical unit, to the optical circulator, to the PBS via the third optical path, and to the polarization reflector, the optical monitor module measuring a frequency of the light or a power level of the light.

12. A laser, comprising:
an optical polarization beam splitter (PBS) having a first port, a second port and a third port, wherein light at a first optical polarization transmits through the PBS between the first port and the second port, and light at a second optical polarization orthogonal to the first optical polarization that enters the first port is directed to the third port;
a first optical path having a first end and a second end, the first end optically coupled to the first port of the PBS to direct light into the first port of the PBS and to receive light in the first optical polarization that transmits through the PBS from the second port to the first port;
a polarization reflector coupled to the second end of the first optical path to reflect light received from the first optical path back to the first optical path with a reflected optical polarization that is orthogonal to a polarization of the light that initially enters the first optical path upon exiting the first port of the PBS;
a second optical path having a first end and a second end, the first end optically coupled to the third port of the PBS to receive light in the second optical polarization from the third port and to direct the received light to the second;
an optical circulator having a first port, a second port and a third port to direct light received at the first port to output at the second port and to direct light received at the second port to output at the third port, the first port being optically coupled to the second end of the second optical path to direct light from the second optical path to the second port;
an optical unit optically coupled to the second port of the optical circulator to receive light and to direct a returned light beam back to the second port of the optical circulator;
a third optical path connected between the third port of the optical circulator and the second port of the PBS to direct the returned light beam from the optical unit at the third port of the optical circulator to the second port of the PBS which directs the light in the first optical polarization in the third optical path from the second port of the PBS to the first port of the PBS; and
an optical amplifier coupled in at least one of the first, second and third optical paths to amplify light to cause a laser oscillation in light circulating from the polarization reflector, to the PBS via the first optical path, to the optical circulator via the second optical path, to the optical unit, to the optical circulator, to the PBS via the third optical path, and to the polarization reflector, wherein:
the optical unit includes a tunable wavelength-filtering optical element optically coupled to the second port of the optical circulator to filter the received light in wavelength; and
the laser comprises an additional optical filter that is located in an optical path of light in the laser, which is in one of the first, second and third optical paths, and has repetitive, periodic transmission peaks.

13. The laser as in claim 12, wherein:
the additional optical filter has a spectral spacing between two adjacent transmission peaks being equal to or comparable to a bandwidth of the tunable wavelength-filtering optical element and a transmission bandwidth that is less than a laser mode spacing of longitudinal modes of the laser.

14. A laser, comprising:

an optical polarization beam splitter (PBS) having a first port, a second port and a third port, wherein light at a first optical polarization transmits through the PBS between the first port and the second port, and light at a second optical polarization orthogonal to the first optical polarization that enters the first port is directed to the third port;

a first optical path having a first end and a second end, the first end optically coupled to the first port of the PBS to direct light into the first port of the PBS and to receive light in the first optical polarization that transmits through the PBS from the second port to the first port;

a polarization reflector coupled to the second end of the first optical path to reflect light received from the first optical path back to the first optical path with a reflected optical polarization that is orthogonal to a polarization of the light that initially enters the first optical path upon exiting the first port of the PBS;

a second optical path having a first end and a second end, the first end optically coupled to the third port of the PBS to receive light in the second optical polarization from the third port and to direct the received light to the second end, wherein the second end of the second optical path is optically coupled to the second port of the PBS which directs the light in the first optical polarization in the second optical path from the second port of the PBS to the first port of the PBS;

an optical amplifier coupled in at least one of the first and second optical paths to amplify light to cause a laser oscillation in light circulating from the polarization reflector, to PBS via the first optical path, to the second optical path, to the PBS, and to the polarization reflector; and an optical monitor module coupled to the first optical path or the second optical path to receive a fraction of the light out of the first or second optical path to split the received fraction of the light into a first monitor light beam and a second monitor light beam, the optical monitor module including (1) an optical power detector to receive the first monitor light beam to produce an output indicating a power level of the light and (2) a laser frequency monitor to receive the second monitor light beam to measure a laser frequency of the light.

15. The laser as in claim 14, wherein:

the polarization reflector comprises a Faraday reflector coupled to a second end of the first optical path to reflect light received from the first optical path back to the first optical path with a reflected optical polarization that is, at each location along the first optical path, orthogonal to an optical polarization of the light when traveling in the first optical path from the PBS towards the Faraday reflector prior to the reflection.

16. The laser as in claim 14, wherein:

the polarization reflector comprises a reflector and a quarter wave plate whose one of two orthogonal principal polarization axes is at 45 degrees with a polarization axis of light exiting the first port of the PBS when entering the first optical path, wherein the quarter wave plate is located between the PBS and the reflector.

17. The laser as in claim 14, comprising:

a tunable wavelength-filtering optical element optically coupled in one of the first and second optical paths to receive light and to filter the received light in wavelength to produce filtered light with a center optical wavelength and to tune the center optical wavelength of light that transmits through the tunable wavelength-filtering optical element.

18. The laser as in claim 14, wherein:

the PBS comprises a birefringent crystal that separates light in the first and second optical polarizations into a first beam along a first beam path and a second beam along a second beam path.

19. The laser as in claim 14, wherein:

the PBS comprises a polarization cube that includes a polarization selective reflective surface to reflect light in the second optical polarization and transmits light in the first polarization.

20. The laser as in claim 14, comprising:

a tunable wavelength-filtering optical element optically coupled in one of the first and second optical paths to receive light and to filter the received light in wavelength to produce filtered light by optical transmission with a center optical wavelength and to tune the center optical wavelength.

21. The laser as in claim 14, comprising:

a first optical filter optically coupled in one of the first and second optical paths to receive light and to filter the received light in wavelength to produce filtered light by optical transmission with a center optical wavelength and to tune the center optical wavelength of light that transmits through the first optical filter; and a second optical filter that is coupled in one of the first and second optical paths and has repetitive, periodic transmission peaks.

22. The laser as in claim 21, wherein:

the second optical filter has a spectral spacing between two adjacent transmission peaks being equal to or comparable to a bandwidth of the first optical filter and a transmission bandwidth that is less than a laser mode spacing of longitudinal modes of the laser.

23. The laser as in claim 14, wherein:

the laser frequency monitor includes:

an optical circulator including a first port that receives the second monitor light beam as input light to the laser frequency monitor, a second port that receives light from the first port and a third port that receives light from the second port;

a fiber Bragg grating coupled to the second port to receive light from the second port, the fiber Bragg grating structured to reflect light at a fiber Bragg grating resonant frequency as a reference frequency back to the second port of the optical circulator and to transmit light at wavelengths different from the reference frequency;

a Fabry-Perot filter coupled to receive transmitted light from the fiber Bragg grating;

a first optical detector coupled to the Fabry-Perot filter to detector optical transmission of the Fabry-Perot filter to produce a first detector signal; and a second optical detector coupled to the third port of the optical circulator to receive light reflected by the fiber Bragg grating at the reference frequency to produce a second detector signal, wherein the first and second detector signals collectively provide a measurement of the laser frequency.

24. The laser as in claim 1, wherein:

the laser frequency monitor includes:

a second optical circulator including a first port that receives the second monitor light beam as input light to the laser frequency monitor, a second port that receives light from the first port and a third port that receives light from the second port;
a fiber Bragg grating coupled to the second port to receive light from the second port, the fiber Bragg grating structured to reflect light at a fiber Bragg grating resonant frequency as a reference frequency back to the second port of the optical circulator and to transmit light at wavelengths different from the reference frequency;
a Fabry-Perot filter coupled to receive transmitted light from the fiber Bragg grating;
a first optical detector coupled to the Fabry-Perot filter to detector optical transmission of the Fabry-Perot filter to produce a first detector signal; and
a second optical detector coupled to the third port of the second optical circulator to receive light reflected by the fiber Bragg grating at the reference frequency to produce a second detector signal, wherein the first and second detector signals collectively provide a measurement of the laser frequency.

* * * * *

UNITED STATES PATENT AND TRADEMARK OFFICE
CERTIFICATE OF CORRECTION

PATENT NO. : 7,983,314 B2
APPLICATION NO. : 12/360761
DATED : July 19, 2011
INVENTOR(S) : Xiaotian Steve Yao It is certified that error appears in the above-identified patent and that said Letters Patent is hereby corrected as shown below:

In Column 3, Line 13, please delete "reflector" and insert -- reflector. --, therefor.

In Column 10, Line 23, please delete "then" and insert -- the --, therefor.

In Column 14, Line 60, in Claim 1, please delete "reflector" and insert -- reflector; --, therefor.

Signed and Sealed this
Twenty-seventh Day of March, 2012

David J. Kappos
*Director of the United States Patent and Trademark Office*